United States Patent
Wang

(10) Patent No.: US 10,071,935 B2
(45) Date of Patent: Sep. 11, 2018

(54) METHOD FOR MANUFACTURING FLEXIBLE GRAPHENE ELECTRICALLY CONDUCTIVE FILM

(71) Applicant: Wuhan China Star Optoelectronics Technology Co., Ltd., Wuhan (CN)

(72) Inventor: Xuanyun Wang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 205 days.

(21) Appl. No.: 15/085,992

(22) Filed: Mar. 30, 2016

(65) Prior Publication Data
US 2017/0253532 A1    Sep. 7, 2017

(30) Foreign Application Priority Data
Mar. 2, 2016  (CN) .......................... 2016 1 0119150

(51) Int. Cl.
*H05B 6/00* (2006.01)
*C04B 35/622* (2006.01)
*C01B 31/04* (2006.01)
*C09D 5/24* (2006.01)

(52) U.S. Cl.
CPC .... *C04B 35/62218* (2013.01); *C01B 31/0438* (2013.01); *C09D 5/24* (2013.01)

(58) Field of Classification Search
CPC . C04B 35/62218; C01B 31/0438; C09D 5/24; B29C 44/321
See application file for complete search history.

(56) References Cited

FOREIGN PATENT DOCUMENTS

| CN | 101645454 A | | 2/2010 |
|---|---|---|---|
| JP | 2015013766 | * | 1/2015 |

\* cited by examiner

*Primary Examiner* — Stella K Yi
(74) *Attorney, Agent, or Firm* — Leong C. Lei

(57) ABSTRACT

A photoelectric converter includes a photoelectric conversion element, which includes a first electrode and a second electrode disposed discretely and a photoelectric conversion material layer disposed between the first electrode and the second electrode and in which a current generated in the photoelectric conversion material layer changes with the lapse of an application time, where a constant amount of light is applied to the photoelectric conversion material layer while a voltage is applied between the first electrode and the second electrode, and a current detection circuit to detect the change in the current.

17 Claims, 5 Drawing Sheets

US 10,071,935 B2

METHOD FOR MANUFACTURING FLEXIBLE GRAPHENE ELECTRICALLY CONDUCTIVE FILM

BACKGROUND OF THE INVENTION

1. Field of the Invention

The present invention relates to the field of display technology, and in particular to a method for manufacturing a flexible graphene electrically conductive film.

2. The Related Arts

A transparent electrically conductive film is a necessary functional material for liquid crystal displays (LCDs) and touch panels (TPs). Existing electrically conductive films that involve mature arts and have excellent performances are primarily metal films and metal oxide films. Indium tin oxide (ITO) films have excellent optical and electrical properties and are thus widely used in the display industry. However, sputtering of ITO films must be carried out in a high temperature and involves pillar like microscopic structure, leading to constraint of its application to low-temperature or room-temperature coatings of flexible bases thereby greatly constraining the progress of flexible display technology. Thus, it is a trend of development to seek for a material that has high electrical conductivity, flexibility and transparency, and low cost for substitute of ITO. With the emergence of graphene that is two-dimensional material, the excellent electrical property and good light transmittance thereof attract wide attention of people. Further, graphene possesses certain features, such as atomic-grade thickness in a vertical direction, atomic-grade levelness, surface inactiveness, and zero trap state and is regarded as the most promising material as a substitute of ITO, and is now a hot spot of international research and study in the display field.

Applying chemical vapor deposition (CVD) to grow graphene on a surface of a base made of metals such as copper is the primary way of obtaining high-quality layer-controllable graphene and such a process has already achieved growth in a large scale for large areas, making a first move toward practical application of graphene as substitute of ITO. However, in the process of practical application, one major problem is to transfer CVD manufactured graphene to a target backing. The most mature state of the art is the so-called PMMA (poly methyl methacrylate) assisted process, wherein a PMMA membrane is taken as a support on a surface of graphene and a copper etchant is applied to etch away and remove metal copper. Then, graphene is transferred to the surface of the backing and finally, the PMMA membrane on the surface of graphene is removed through dissolution. It is noted that due to the strong attachability of the graphene surface and also the limited dissolubility of the PMMA polymer in an organic solvent, it is easy to cause residues of PMMA left on the graphene surface, leading to negative influence on the electrical property of graphene. Further, the organic solvent, which is generally acetone, cannot be repeatedly reused to remove PMMA and this would cause a great burden to the environment.

SUMMARY OF THE INVENTION

An object of the present invention is to provide a method for manufacturing a flexible graphene electrically conductive film, which provides a flexible graphene electrically conductive film free of surface residue and involves a manufacturing process that requires no organic solvent, has a simple operation and a low cost, and is green and environment friendly.

To achieve the above object, the present invention provides a method for manufacturing a flexible graphene electrically conductive film, which comprises the following steps:

(1) providing a base and forming a graphene layer on a surface of the base;

(2) providing polyvinyl alcohol, dissolving polyvinyl alcohol in water and heating to form a colloidal solution, which after cooling, forms a polyvinyl alcohol colloidal solution; and coating the polyvinyl alcohol colloidal solution on a surface of the graphene layer and drying so as to form a supporting layer on the surface of the graphene layer;

(3) removing the base from the graphene layer to obtain the graphene layer that is covered with the supporting layer; and (4) placing the graphene layer that is covered with the supporting layer in water to allow the supporting layer on the surface of the graphene layer to dissolve in water thereby obtaining a flexible graphene electrically conductive film that is free of surface residue.

The base is made of a material comprising a metal; and step (1) applies a chemical vapor deposition process to heat the base and at the same time supplies a hydrocarbon gas and a carrier gas to the surface of the base so as to form the graphene layer on the surface of the base.

The base is formed of a material comprising copper, nickel, or ruthenium; the hydrocarbon gas is methane; and the carrier gas is hydrogen.

Step (2) applies a spin coating process to coat the polyvinyl alcohol colloidal solution on the surface of the graphene layer.

In step (2), the base on which the polyvinyl alcohol colloidal solution is coated is placed on a heating board for drying, wherein the temperature range of the heating board is 100° C.-250° C.

Step (3) applies a solution-based process to have the base dissolved in a corrosive liquid in order to remove the base from the graphene layer.

Step (3) applies an electrochemical process to corrode off the base so as to remove the base from the graphene layer.

Step (3) comprises: providing a first electrode on the base to cover the supporting layer and the graphene layer; arranging, in sequence, a solid electrolyte and a second electrode on an under surface of the base; electrically connecting the first electrode and the second electrode to positive and negative electrodes of a power supply to conduct an electrochemical reaction to corrode off the base in order to remove the base from the graphene layer.

The first electrode and the second electrode are both graphite electrodes.

Step (3) applies a mechanical separation process to strip the base off the graphene layer so as to remove the base from the graphene layer.

The efficacy of the present invention is that the present invention provides a method for manufacturing a flexible graphene electrically conductive film, which first forms a graphene layer on a surface of a base, then preparing a polyvinyl alcohol colloidal solution and coating the polyvinyl alcohol colloidal solution on a surface of the graphene layer to form a supporting layer, and then removing the base from the graphene layer, and finally, dissolving the supporting layer on the surface of the graphene layer in water so as to form a flexible graphene electrically conductive film that is free of residue on surface. The present invention uses polyvinyl alcohol to form a supporting layer, and since polyvinyl alcohol contains a large number of hydroxyl groups, which form a large number of hydrogen bonds in water so that the dissolvability of polyvinyl alcohol is greatly enhanced to a condition of being completely dissolved, whereby the flexible graphene electrically conductive film so manufactured has a surface that is free of residue at an atomic grade, the structure being integrated and free of defects, making it suitable for formation of a flexible graphene electrically conductive film of a large area; further, water can be used to replace the use of a large amount of organic solvent, making the operation easy, low cost, and green and environment-friendly.

BRIEF DESCRIPTION OF THE DRAWINGS

For better understanding of the features and technical contents of the present invention, reference will be made to the following detailed description of the present invention and the attached drawings. However, the drawings are provided for the purposes of reference and illustration and are not intended to impose limitations to the present invention.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
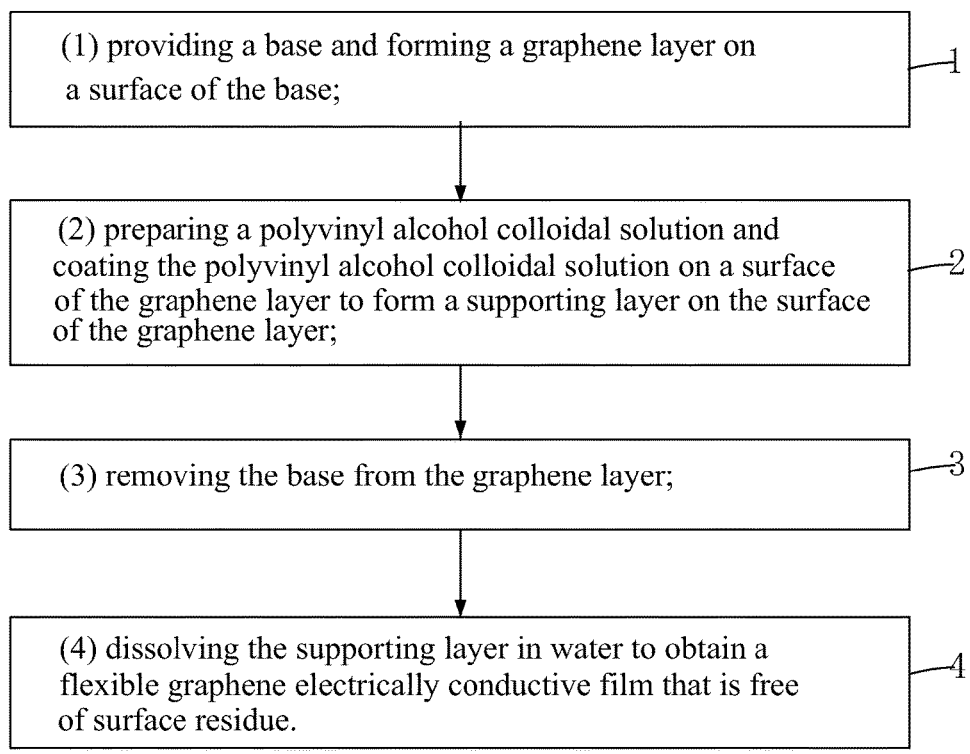
FIG. 1 is a flow chart illustrating a method for manufacturing a flexible graphene electrically conductive film according to the present invention.
Figure 2:
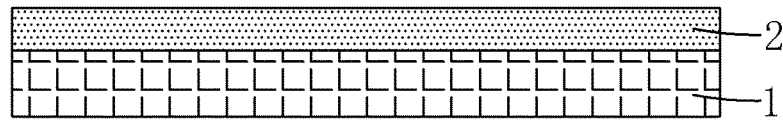
FIG. 2 is a schematic view illustrating step 1 of the method for manufacturing a flexible graphene electrically conductive film according to the present invention.

Referring to FIG. 1, the present invention provides a method for manufacturing a flexible graphene electrically conductive film, which comprises the following steps:

Step 1: as shown in FIG. 2, providing a base 1 and forming a graphene layer 2 on a surface of the base 1.

Specifically, the base 1 is made of a material comprising a metal. Step 1 is conducted in a condition of high temperature and low pressure by applying a chemical vapor deposition process to heat the base 1 and at the same time supply a hydrocarbon gas and a carrier gas to the surface of the base 1 so as to form the graphene layer 2 on the surface of the base 1.

Specifically, Step 1 is conducted at a condition that temperature is greater than 800° C. and pressure is $10^5$ Pa-$10^{-3}$ Pa.

Preferably, the base 1 is made of a material comprising copper (Cu), nickel (Ni), or ruthenium (Ru).

Preferably, the hydrocarbon gas is methane ($CH_4$), and the carrier gas is hydrogen ($H_2$).

Figure 3:
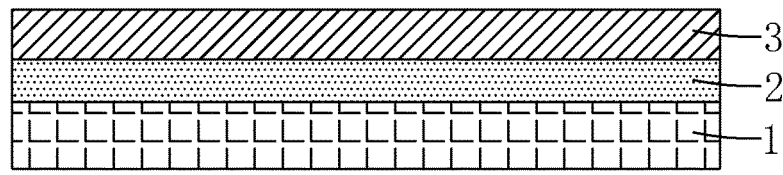
FIG. 3 is a schematic view illustrating step 2 of the method for manufacturing a flexible graphene electrically conductive film according to the present invention.

Step 2: as shown in FIG. 3, providing polyvinyl alcohol (PVA), dissolving polyvinyl alcohol in water and heating to form a colloidal solution, which after cooling, forms a polyvinyl alcohol colloidal solution; and coating the polyvinyl alcohol colloidal solution on a surface of the graphene layer 2 and drying so as to form a supporting layer 3 on the surface of the graphene layer 2.

Specifically, Step 2 applies a spin coating process to coat the polyvinyl alcohol colloidal solution on the surface of the graphene layer 2.

Specifically, in Step 2, the base 1 on which the polyvinyl alcohol colloidal solution is coated is placed on a heating board for drying, wherein the temperature range of the heating board is 100° C.-250° C.

Figure 4:
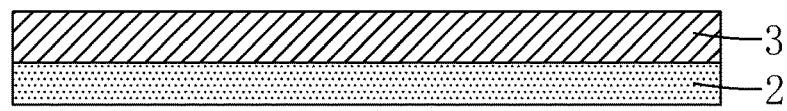
FIG. 4 is a schematic view illustrating step 3 of the method for manufacturing a flexible graphene electrically conductive film according to the present invention.

Step 3: as shown in FIG. 4, removing the base 1 from the graphene layer 2 to obtain the graphene layer 2 that is covered with the supporting layer 3.

Figure 5:
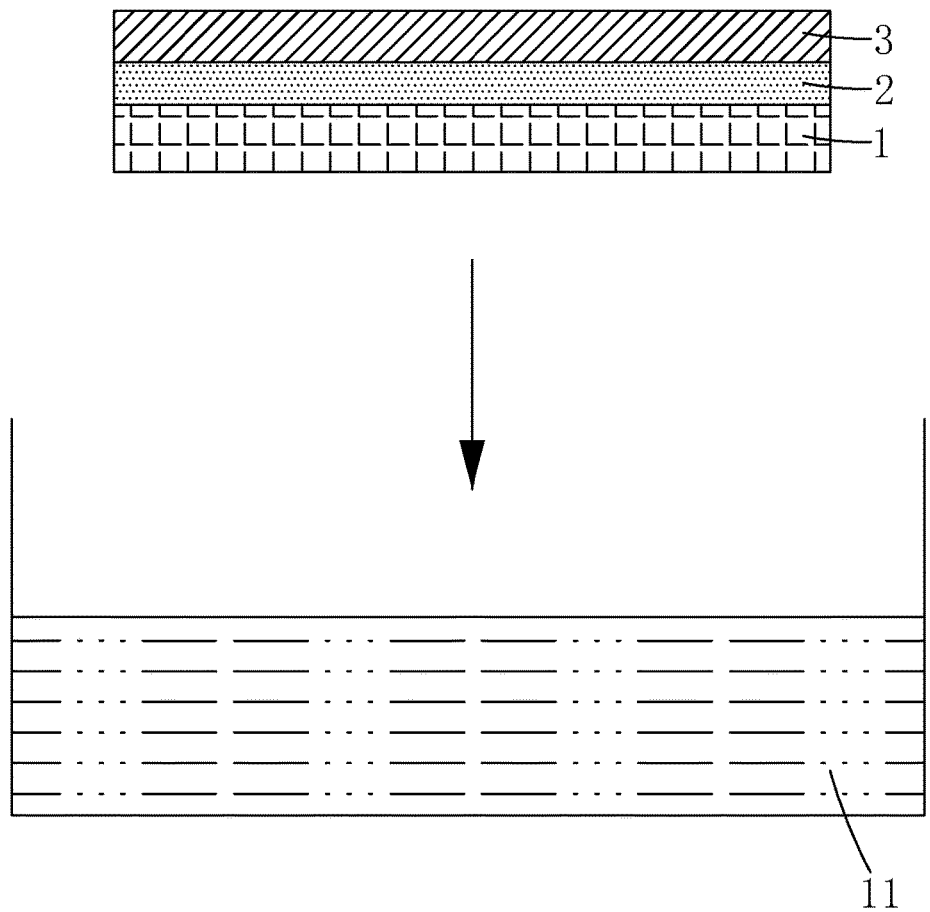
FIG. 5 is a schematic view illustrating a first example for conducting step 3 of the method for manufacturing a flexible graphene electrically conductive film according to the present invention.

Optionally, as shown in FIG. 5, Step 3 applies a solution-based process to have the base 1 dissolved in a corrosive liquid 11 in order to remove the base 1 from the graphene layer 2.

Specifically, when the material that makes the base 1 is copper, the corrosive liquid 11 is a liquid showing strong oxidizability, such as ferric chloride ($FeCl_3$) solution and ammonium persulfate (($NR_4$)$_2S_2O_8$) solution.

Figure 6:
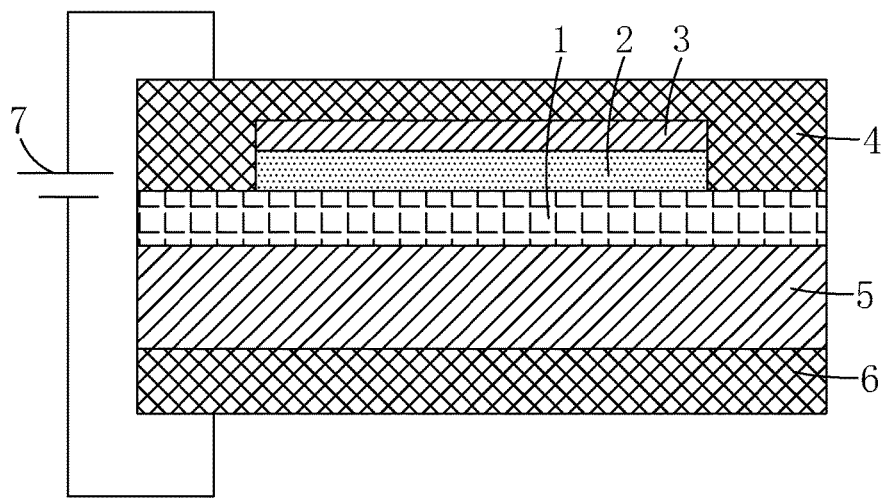
FIG. 6 is a schematic view illustrating a second example for conducting step 3 of the method for manufacturing a flexible graphene electrically conductive film according to the present invention.

Optionally, as shown in FIG. 6, Step 3 applies an electrochemical process to corrode off the base 1 so as to remove the base 1 from the graphene layer 2.

Figure 7:
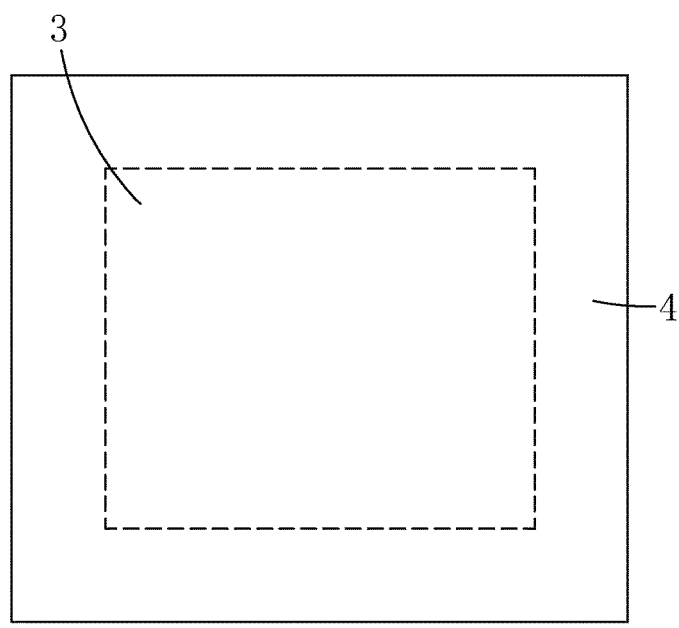
FIG. 7 is a top plan view of FIG. 6.
Figure 8:
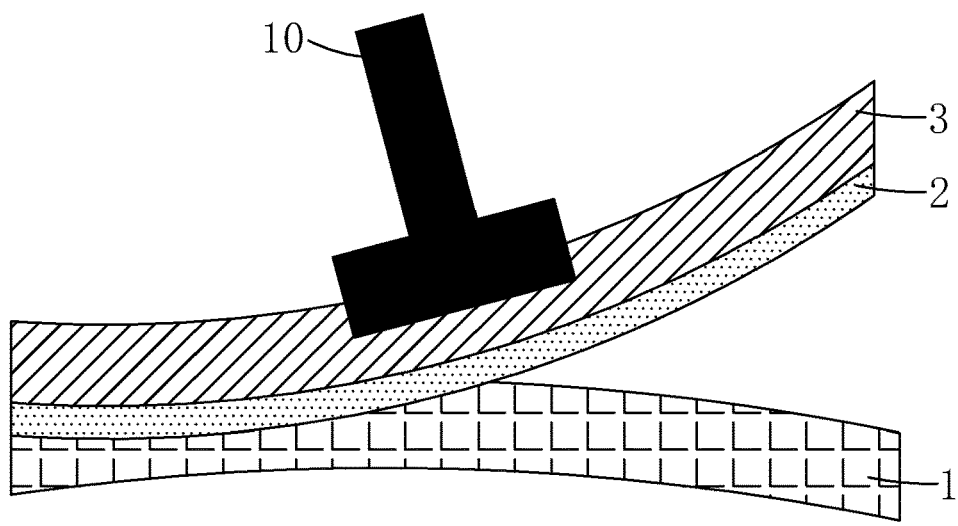
FIG. 8 is a schematic view illustrating a third example for conducting step 3 of the method for manufacturing a flexible graphene electrically conductive film according to the present invention.

Specifically, referring to both FIGS. 6 and 7, Step 3 comprises: providing a first electrode 4 on the base 1 to cover the supporting layer 3 and the graphene layer 2; arranging, in sequence, a solid electrolyte 5 and a second electrode 6 on an under surface of the base 1; electrically connecting the first electrode 4 and the second electrode 6 to positive and negative electrodes of a power supply to conduct an electrochemical reaction to corrode off the base 1 in order to remove the base 1 from the graphene layer 2.

Specifically, the first electrode 4 and the second electrode 6 are both graphite electrodes.

Specifically, when the material that makes the base 1 is copper, the solid electrolyte 5 is formed of a material that comprises copper sulfate ($CuSO_4$) and agar.

Optionally, as shown in FIG. 7, Step 3 applies a hot pressing process with a hot press 10 to strip the base 1 off the graphene layer 2 so as to remove the base 1 from the graphene layer 2.

Figure 9:
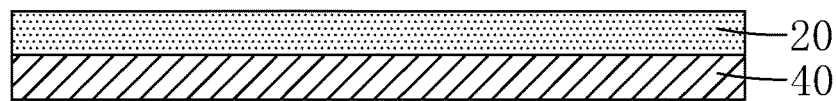
FIG. 9 is a schematic view illustrating step 4 of the method for manufacturing a flexible graphene electrically conductive film according to the present invention.

Step 4: placing the graphene layer 2 that is covered with the supporting layer 3 in water to allow the supporting layer 3 on the surface of the graphene layer 2 to dissolve in water thereby obtaining a flexible graphene electrically conductive film 20 that is free of surface residue as shown in FIG. 9. Since polyvinyl alcohol contains a large number of hydroxyl groups, which form a large number of hydrogen bonds in water so that the dissolvability of polyvinyl alcohol is greatly enhanced to a condition of being completely dissolved, whereby the flexible graphene electrically conductive film so manufactured has a surface that is free of residue at an atomic grade, the structure being integrated and free of defects, making it suitable for formation of a flexible graphene electrically conductive film of a large area; further, water can be used to replace the use of a large amount of organic solvent, making the operation easy, low cost, and green and environment-friendly.

Specifically, as shown in FIG. 9, Step 4 further comprises positioning a target backing 40 in water to allow the flexible graphene electrically conductive film 20 to be transferred to the target backing 40.

In summary, the present invention provides a method for manufacturing a flexible graphene electrically conductive film, which first forms a graphene layer on a surface of a base, then preparing a polyvinyl alcohol colloidal solution and coating the polyvinyl alcohol colloidal solution on a surface of the graphene layer to form a supporting layer, and then removing the base from the graphene layer, and finally, dissolving the supporting layer on the surface of the graphene layer in water so as to form a flexible graphene electrically conductive film that is free of residue on surface. The present invention uses polyvinyl alcohol to form a supporting layer, and since polyvinyl alcohol contains a large number of hydroxyl groups, which form a large number of hydrogen bonds in water so that the dissolvability of polyvinyl alcohol is greatly enhanced to a condition of being completely dissolved, whereby the flexible graphene electrically conductive film so manufactured has a surface that is free of residue at an atomic grade, the structure being integrated and free of defects, making it suitable for formation of a flexible graphene electrically conductive film of a large area; further, water can be used to replace the use of a large amount of organic solvent, making the operation easy, low cost, and green and environment-friendly.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a flexible graphene electrically conductive film, comprising the following steps:
   (1) providing a base and forming a graphene layer on a surface of the base;
   (2) providing polyvinyl alcohol, dissolving polyvinyl alcohol in water and heating to form a colloidal solution, which after cooling, forms a polyvinyl alcohol colloidal solution; and coating the polyvinyl alcohol colloidal solution on a surface of the graphene layer and drying so as to form a supporting layer on the surface of the graphene layer;
   (3) removing the base from the graphene layer to obtain the graphene layer that is covered with the supporting layer; and
   (4) placing the graphene layer that is covered with the supporting layer in water to allow the supporting layer on the surface of the graphene layer to dissolve in water thereby obtaining a flexible graphene electrically conductive film that is free of surface residue;
   wherein the base is made of a material comprising a metal; and step (1) applies a chemical vapor deposition process to heat the base and at the same time supplies a hydrocarbon gas and a carrier gas to the surface of the base so as to form the graphene layer on the surface of the base.

2. The method for manufacturing a flexible graphene electrically conductive film as claimed in claim 1, wherein the base is formed of a material comprising copper, nickel, or ruthenium; the hydrocarbon gas is methane; and the carrier gas is hydrogen.

3. The method for manufacturing a flexible graphene electrically conductive film as claimed in claim 1, wherein step (2) applies a spin coating process to coat the polyvinyl alcohol colloidal solution on the surface of the graphene layer.

4. The method for manufacturing a flexible graphene electrically conductive film as claimed in claim 1, wherein in step (2), the base on which the polyvinyl alcohol colloidal solution is coated is placed on a heating board for drying, wherein the temperature range of the heating board is 100° C.-250° C.

5. The method for manufacturing a flexible graphene electrically conductive film as claimed in claim 1, wherein step (3) applies a solution-based process to have the base dissolved in a corrosive liquid in order to remove the base from the graphene layer.

6. The method for manufacturing a flexible graphene electrically conductive film as claimed in claim 1, wherein step (3) applies an electrochemical process to corrode off the base so as to remove the base from the graphene layer.

7. The method for manufacturing a flexible graphene electrically conductive film as claimed in claim 6, wherein step (3) comprises: providing a first electrode on the base to cover the supporting layer and the graphene layer; arranging, in sequence, a solid electrolyte and a second electrode on an under surface of the base; electrically connecting the first electrode and the second electrode to positive and negative electrodes of a power supply to conduct an electrochemical reaction to corrode off the base in order to remove the base from the graphene layer.

8. The method for manufacturing a flexible graphene electrically conductive film as claimed in claim 7, wherein the first electrode and the second electrode are both graphite electrodes.

9. The method for manufacturing a flexible graphene electrically conductive film as claimed in claim 1, wherein step (3) applies a mechanical separation process to strip the base off the graphene layer so as to remove the base from the graphene layer.

10. A method for manufacturing a flexible graphene electrically conductive film, comprising the following steps:
   (1) providing a base and forming a graphene layer on a surface of the base;
   (2) providing polyvinyl alcohol, dissolving polyvinyl alcohol in water and heating to form a colloidal solution, which after cooling, forms a polyvinyl alcohol colloidal solution; and coating the polyvinyl alcohol colloidal solution on a surface of the graphene layer and drying so as to form a supporting layer on the surface of the graphene layer;
   (3) removing the base from the graphene layer to obtain the graphene layer that is covered with the supporting layer; and
   (4) placing the graphene layer that is covered with the supporting layer in water to allow the supporting layer on the surface of the graphene layer to dissolve in water thereby obtaining a flexible graphene electrically conductive film that is free of surface residue;
   wherein step (3) applies a solution-based process to have the base dissolved in a corrosive liquid in order to remove the base from the graphene layer.

11. The method for manufacturing a flexible graphene electrically conductive film as claimed in claim 10, wherein step (2) applies a spin coating process to coat the polyvinyl alcohol colloidal solution on the surface of the graphene layer.

12. The method for manufacturing a flexible graphene electrically conductive film as claimed in claim 10, wherein in step (2), the base on which the polyvinyl alcohol colloidal solution is coated is placed on a heating board for drying, wherein the temperature range of the heating board is 100° C.-250° C.

13. A method for manufacturing a flexible graphene electrically conductive film, comprising the following steps:
   (1) providing a base and forming a graphene layer on a surface of the base;
   (2) providing polyvinyl alcohol, dissolving polyvinyl alcohol in water and heating to form a colloidal solution, which after cooling, forms a polyvinyl alcohol colloidal solution; and coating the polyvinyl alcohol colloidal solution on a surface of the graphene layer and drying so as to form a supporting layer on the surface of the graphene layer;
   (3) removing the base from the graphene layer to obtain the graphene layer that is covered with the supporting layer; and
   (4) placing the graphene layer that is covered with the supporting layer in water to allow the supporting layer on the surface of the graphene layer to dissolve in water thereby obtaining a flexible graphene electrically conductive film that is free of surface residue;
   wherein step (3) applies an electrochemical process to corrode off the base so as to remove the base from the graphene layer.

14. The method for manufacturing a flexible graphene electrically conductive film as claimed in claim 13, wherein step (3) comprises: providing a first electrode on the base to cover the supporting layer and the graphene layer; arranging, in sequence, a solid electrolyte and a second electrode on an under surface of the base; electrically connecting the first electrode and the second electrode to positive and negative electrodes of a power supply to conduct an electrochemical reaction to corrode off the base in order to remove the base from the graphene layer.

15. The method for manufacturing a flexible graphene electrically conductive film as claimed in claim 14, wherein the first electrode and the second electrode are both graphite electrodes.

16. The method for manufacturing a flexible graphene electrically conductive film as claimed in claim 13, wherein step (2) applies a spin coating process to coat the polyvinyl alcohol colloidal solution on the surface of the graphene layer.

17. The method for manufacturing a flexible graphene electrically conductive film as claimed in claim 13, wherein in step (2), the base on which the polyvinyl alcohol colloidal solution is coated is placed on a heating board for drying, wherein the temperature range of the heating board is 100° C.-250° C.

* * * * *